US008880275B1

(12) United States Patent
Del Savio et al.

(10) Patent No.: US 8,880,275 B1
(45) Date of Patent: Nov. 4, 2014

(54) AUTONOMOUS UNDERWATER VEHICLE CONTROL SYSTEM AND METHOD

(75) Inventors: James A. Del Savio, East Providence, RI (US); Richard P. Berube, Portsmouth, RI (US); Stuart K. Beazley, Kingston, RI (US); Ryan K. Miller, Middletown, RI (US); Peter Licis, Tiverton, RI (US); Alberico Menozzi, Raleigh, NC (US)

(73) Assignee: The United States of America as represented by the Secretary of the Navy, Washington, DC (US)

( * ) Notice: Subject to any disclaimer, the term of this patent is extended or adjusted under 35 U.S.C. 154(b) by 239 days.

(21) Appl. No.: 13/527,658

(22) Filed: Jun. 20, 2012

(51) Int. Cl.
*G05D 1/00* (2006.01)
*G05D 1/10* (2006.01)

(52) U.S. Cl.
CPC ............... *G05D 1/10* (2013.01); *G05D 1/0022* (2013.01)
USPC ............................ 701/29.2; 701/21; 114/312

(58) Field of Classification Search
CPC .................. G63G 2008/001; G63G 2008/002; G63G 2008/004; G63G 2008/00; G05D 1/0022; G06S 5/0009; G06S 19/18; G06S 11/14
USPC ....................... 701/21; 367/131, 133; 114/312
See application file for complete search history.

(56) References Cited

U.S. PATENT DOCUMENTS

| 7,714,702 B2 * | 5/2010 | Khuzadi ...................... 340/425.5 |
| 2005/0149236 A1 * | 7/2005 | Potter et al. ...................... 701/21 |

\* cited by examiner

*Primary Examiner* — Marthe Marc-Coleman
(74) *Attorney, Agent, or Firm* — James M. Kasischke; Michael P. Stanley

(57) ABSTRACT

A vehicle control system is provided that includes an internal communications system. The vehicle control system further includes a controller configured to communicate with a plurality of independent vehicle systems via the internal communications system. The controller stores and accesses a plurality of libraries of system processes having data associated with the plurality of vehicle components. The controller maintains an operational state for the vehicle during an operational failure of at least one of the plurality of independent vehicle systems.

1 Claim, 3 Drawing Sheets

AUTONOMOUS UNDERWATER VEHICLE CONTROL SYSTEM AND METHOD

STATEMENT OF GOVERNMENT INTEREST

The invention described herein may be manufactured and used by or for the Government of the United States of America for governmental purposes without the payment of any royalties thereon or therefor.

CROSS REFERENCE TO OTHER PATENT APPLICATIONS

None.

BACKGROUND OF THE INVENTION (1) Field of the Invention

The present invention generally relates to a vehicle control system and more particularly, to an autonomous reconfigurable underwater vehicle control system capable of operating independently from other vehicle systems.

(2) Description of the Prior Art

Unmanned underwater vehicles (UUV) are known and used for a variety of missions, including anti-mine operations, oceanographic analysis, reconnaissance, intelligence gathering, and tracking of marine vehicles. Control of a UUV (i.e., control over the UUV and/or a plurality of the components included on the UUV) can generally be accomplished either remotely, (for example: via a tether) or internally by using a master vehicle control.

With regard to the internal vehicle control systems, the UUV may include an internal control architecture which controls the overall operation of the UUV as well as the operation of the various components contained in the vehicle. However, these vehicle control systems are limited and are subject to catastrophic failure in a variety of situations. Such limitations may result in mission failure as well as a loss of the UUV itself.

A number of prior art references address various aspects of UUV technology. For example, United States Patent Publication No. 2011/0144836 (Larkin et al) relates to a UUV navigation and guidance system. Generally, the Larkin reference describes a method to provide navigational aid to a UUV without the requirement of the vehicle surfacing. The reference describes the use of sonar systems in obtaining position data from a host platform and using the position data as an observation for the navigation system. However, the Larkin reference does not generally teach particulars relating to vehicle control.

U.S. Pat. No. 6,118,066 (Sirmalis et al.), relates to the physical and/or operational concept for an autonomous UUV—expanding the theater of operations for a submarine or surface ship. The Sirmalis reference generally teaches the UUV to be conformal to the hull of another vessel. Sirmalis does not teach the particulars relating to vehicle control.

Lastly, United States Patent Publication No. 2004/0065247 (Horton) relates to a potential use of an UUV to track and record data from submarines. The UUV attaches to the hull of the submarine being tracked and, from there, collects and reports data about the submarine. The Horton reference does not teach or suggest particulars relating to the vehicle control.

Thus, there is a need for an autonomous underwater vehicle control system that is more reliable than existing vehicle control systems and which can ensure continued mission operation, even when one or more of the components included in the UUV are non-functional.

SUMMARY OF THE INVENTION

Accordingly, it is a primary object and general purpose of the present invention to provide an autonomous UUV control system that is adaptive, dynamically reconfigurable, and reliable.

It is a further object of the present invention to provide a reconfigurable autonomous vehicle control system that allows programming of components and missions.

With the above and other objects in view, a feature of the present invention is an enhanced vehicle control system. The control system comprises an internal communications system and a controller configured to communicate with a plurality of independent vehicle systems. The controller stores and accesses a plurality of libraries of system processes having data associated with the vehicle components. The controller maintains an operations state for the vehicle during an operational failure of one or more of the independent vehicle systems.

In accordance with another feature of the present invention; there is provided an underwater vehicle system. The system comprises an internal communication system and a plurality of independent vehicle systems configured to communicate via the internal communication system. The system further comprises a vehicle control system configured to communicate with the independent vehicle systems. The control system is configured to monitor the independent vehicle systems and to maintain an operational state for the vehicle during an operational failure of one or more of the independent vehicle systems.

In accordance with a still further feature of the present invention; there is provided a method of controlling an underwater vehicle. The method comprises the step of accessing a plurality of libraries having data associated with each of the independent vehicle systems. The method further comprises the step of executing a mission file in which the mission file contains data associated with vehicle guidance and commands for operational timing control over the vehicle systems. The method still further comprises the step of maintaining an operation state for the vehicle during an operational failure of one or more of the independent vehicle systems.

Other objects, features, and advantages of the present invention will be apparent to those having ordinary skill in the art reading the instant specification, drawings, and appended claims.

DETAILED DESCRIPTION OF THE INVENTION

Figure 1:
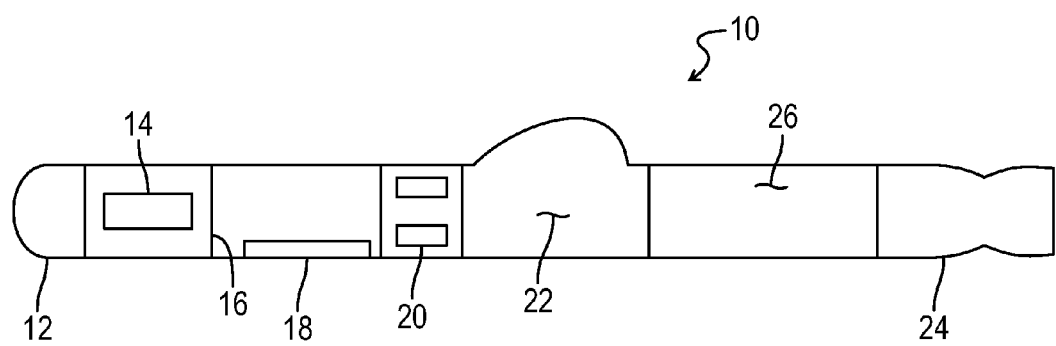
FIG. 1 is an illustration of an unmanned underwater vehicle representing the present invention.

Referring now to the drawings, and more particularly to FIG. 1; there is shown an exemplary UUV 10 constructed in accordance with the present invention. More particular, the UUV 10 shown in FIG. 1 is embodied as a Midsized Autonomous Reconfigurable Vehicle (MARV), hereinafter referred to as the vehicle 10. The vehicle 10 may be configured to interface with pneumatic surface ship tube launchers or hydraulic submarine torpedo tube launchers. The vehicle 10 may further be configured to be recovered inside a submarine torpedo tube.

As is understood in the art, the UUV 10 generally includes components and/or systems adapted to perform functions necessary for effective operation. As illustrated in FIG. 1, the vehicle 10 includes a nose section 12, a bathymetry section 14, a vehicle bulkhead 16, side scan sonar 18, an energy section 20, a navigation section 22, an afterbody section 24, and a hotel section 26. The vehicle 10 may comprise other configurations (for example: a chemical sensor, video camera, side-scan sonar, bathymetry sonar, and vector sonar).

The nose section 12 comprises components and/or systems such as a tracking transducer, an acoustic communication system (ACOMMS) transducer, one or more cameras, one or more pressure sensors, a DCO switch, as well as an EOR location pinger. The bathymetry section 14 comprises components and/or systems configured to perform certain mapping and/or terrain following functions.

The side scan sonar 18 comprises a sonar system. The energy section 20 includes an energy source that provides operating power and/or voltage to the components of the vehicle 10. Exemplary energy sources include, but are not limited to a lithium battery or a lead acid battery.

The navigation section 22 comprises components that provide navigation information for the vehicle 10. Exemplary components include a ring laser gyro, a RDI Doppler velocity log, a wireless communications antenna, global positioning system, etc. The afterbody section 24 comprises components generally relating to the propulsion of the vehicle 10. Exemplary components include a tail, propulsors, actuators, a motor/actuator/thruster controller, motor, etc. Generally, the components comprising the afterbody section 24 provide a robust propulsion system for the vehicle 10.

The hotel section 26 comprises components relating to electronic or operational control of at least a portion of the vehicle 10. The hotel section 26 may comprise a power distribution system, a control system, a video recording system, an ACOMMS system, startup circuitry, a casualty assist monitoring system, a radio frequency bridge, an Ethernet switch, as well as one or more servers.

Generally, the components comprising the vehicle 10 are separable by general function but work together to provide an integrated vehicle. That is, the components and/or subcomponents included in the vehicle 10 may be divided into groups relating to the functions that each of the components performs. Collectively, the components interact to enable a functional vehicle 10.

Figure 2:
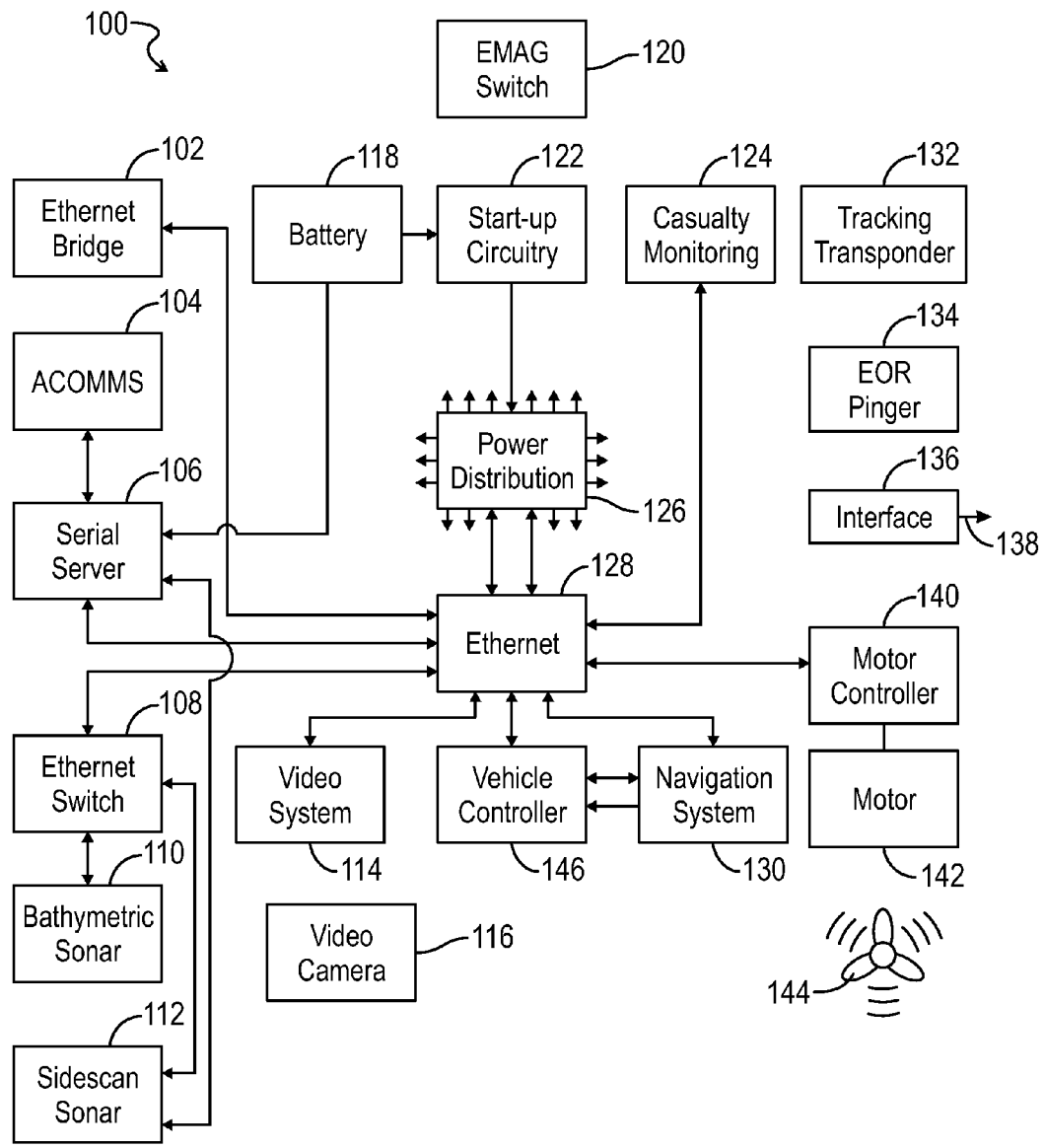
FIG. 2 is a block diagram of a vehicle control system constructed in accordance with the present invention.

Turning now to more particular aspects of the present disclosure and referring to FIG. 2; there is shown a block diagram of an exemplary vehicle system (also referred to as the vehicle control system 100). The system 100 may comprise an RF Ethernet bridge 102, an ACOMMS system 104, a serial server 106, an Ethernet switch 108, a Bathymetric Sonar 110, a sidescan sonar 112, an autonomous controller/video system 114, one or more video cameras 116, a battery 118, EMAG switches 120, start-up circuitry 122, a casualty monitoring system 124, a power distribution assembly 126, an Ethernet system 128, a navigation system 130, a tracking transponder 132, an EOR pinger 134 (e.g., a range tracking pinger), an actuator interface module 136, one or more fins 138, a motor/actuator controller 140, a motor 142, one or more propellers 144, and a vehicle controller 146 (also referred to as the controller).

Broadly, the system 100 comprises an internal communications system. In a preferred embodiment, the internal communications system is implemented via the Ethernet system 128. The Ethernet system 128 is in electrical communication with the serial server 106, the Ethernet switch 108, as well as any of the remaining components comprising the system 100. As is generally understood, the Ethernet system 128 is configured to provide networking technologies linking the vehicle systems/sub-systems together. It is to be understood though that the system 100 may implement the internal communication system with something other than the Ethernet system. For example, the internal communication system may be implemented as an internal wireless communication system, optical communication system, and the like.

The RF Ethernet bridge 102 is configured to provide an interface between the internal communication system (e.g., the Ethernet system 128) and an RF communication system (not shown) so as to permit RF communication between the vehicle and an external vehicle (e.g., a topside ship). Similarly, the ACOMMS 104 in cooperation with the serial server 106 may be configured to provide a communications interface between the internal communications system and an external acoustic communications system.

The bathymetric sonar 110 and sidescan sonar 112 are configured to provide various sonar data, as would be understood in the art. The sonars 110 and 112 are further configured to communicate with the internal communication system of the system 100 via the Ethernet switch 108.

The autonomous controller/video system 114 in cooperation with the one or more video cameras 116 is configured to provide video functionality to the system 100. The autonomous controller/video system 114 may be configured to communicate with the internal communication system of the system 100 (for example: with the Ethernet system 128).

The battery 118, EMAG switches 120, start-up circuitry 122, and the power distribution assembly 126 cooperate to provide an operating source (e.g., voltage) to the system 100 and to distribute the operating source to the components of the system. The power providing and distribution systems 118 thru 126 are configured to communicate with the internal communication system of the system 100 (for example: to communicate with the Ethernet system 128).

As would be understood in the art, the navigation system 130 may be configured to provide navigation-related data to/from the system 100. The navigation system 130 may also be configured to communicate with the internal communication system of the system 100.

The tracking transponder 132 and the EOR pinger 134 are configured to communicate with the internal communication system of the system 100. The tracking transponder 132 and the EOR pinger 134 provide data relating to the tracking and distance of the vehicle 10.

The motor/actuator controller 140 is in electrical communication with the actuator interface module 136 and the motor 142 to control the one or more fins 138 and/or the one or more propellers 144 in order to provide propulsion and/or directional control of the vehicle 10. The motor/actuator controller 140 may be further configured to communicate with the internal communication system of the system 100 (for example: to communicate with the Ethernet system 128).

And lastly, the vehicle controller 146 may be configured to communicate with the plurality of independent vehicle systems via the internal communication systems. The controller 146 stores and/or accesses a plurality of libraries of system processes. The libraries of system processes may have data associated with the vehicle components.

More particularly, the internal vehicle control system 100 implements a vehicle control system about a main network hub (for example: the Ethernet system 128). The components forming the system 100 are joined via an internal communications system (for example: as the vehicle network shown by lines connecting the Ethernet system 128 to the various components). The internal vehicle communication system is preferably implemented using the Ethernet system 128. Each joined component is capable of responding to commands sent via the Ethernet system 128 and acting with independent time control from vehicle controller supervisory processes operating on the controller 146.

The controller 146 may be a processor joined to libraries of system processes. The libraries are provided for all possible components, not just the currently configured components. The libraries may specify the messaging types, protocols, and casualty conditions for each of the components. As an initialization process, the vehicle controller 146 identifies the components currently installed on the vehicle 10 and current configuration information is sent to the user. The user then can download pre-set information and select missions—as well as performing related tasks.

This architecture allows separation between the vehicle control processing (e.g., the controller 146) and component processing on the various other components. The controller 146 may be configured to run supervisory processes in order to coordinate the independent components.

The vehicle controller 146 may be programmed with a mission file provided by a user. This mission file preferably provides waypoints (for example: through coordinates). In other embodiments, the mission file may provide direct navigational distance. The mission file commands may provide for activation and/or deactivation of the vehicle components. As discussed hereinafter, the mission file may specify responses to component casualties as well as thresholds for casualty declaration. Concerning navigational commands from the mission file, these commands may be provided as coordinates to the guidance process. The navigational system 130 comprises a GPS receiver as well as inertial and acoustic components; thereby, allowing the navigational system to determine the current position of the vehicle 10. The guidance process utilizes data from the navigational system 130 to calculate the bearing and velocity required for the vehicle 10 to reach the specified waypoint. In the timestamp system, each component generates a timestamp at a predetermined interval. The supervisory process of the vehicle controller 146 monitors these timestamps from each of the component processes. The supervisory process may compare the timestamp against a preprogrammed response interval for the component process. If the timestamp is within the preprogrammed response interval, the supervisory process indicates the component as being functional. If the timestamp exceeds the response interval or no timestamp is received, the vehicle controller 146 marks the component as a casualty and takes programmed action for that type of component failure. That is, the vehicle controller 146 maintains an operation state for the vehicle 10 during an operational failure of one or more of the independent vehicle systems or components.

Vehicle components may also be monitored for threshold casualties. These may be conditions such as pressure, temperature, or signal levels that could indicate a failure of the component. These may be readings generated by the particular components of the vehicle. Threshold levels are preprogrammed into the vehicle controller 146.

The vehicle controller 146 may also monitor for event casualties and process-driven timeouts. These timeouts occur when the vehicle controller 146 requests that a component perform an event, and the component does not report on completion of the event within a certain period of time. For example, if the controller 146 requests that the guidance control process surface the vehicle, and the vehicle has not surfaced within a predetermined period of time, an event casualty occurs. As would be understood, event casualties occur most often with navigational commands. The mission file can contain contingency commands that can issue on the occurrence of specified event casualties.

In many cases, a component failure does not mean that the mission of the vehicle 10 should be terminated. The programmed actions can include utilizing a backup system, operating at a different depth, changing course, surfacing, etc. The actions, threshold levels, and events are typically downloaded by the operator as part of the configuration—once initialization is complete.

The vehicle controller 146 is preprogrammed with the available components and the basic vehicle configuration. Upon configuration, the vehicle controller 146 conveys this information to external programming software. The vehicle controller 146 may also use this information to ensure that the controller is being properly configured by the external programming software. Errors involving programmed mission parameters and components are reported to the external programming software during initial configuration.

An exemplary list of the supervisory processes functions operating on the controller 146 include, but are not limited to: (1) checks recorded timestamps to verify that processes are operating and commands the casualty monitoring system to request a shutdown if circumstances require; (2) checks data for threshold casualties and performs appropriate actions based on present conditions; (3) accepts a process generated timeout or event casualty and performs appropriate actions based on present conditions; (4) checks the validity of commands received by a launch control software input process and acts on the commands; (5) checks and executes mission files by providing goal information to the guidance process; and (6) periodically checks for ACOMMS and wireless commands updates (if these systems are active).

The controller 146 may also be configured to implement a message queue library which allows for communication between other component processes. The message queue library controls the flow of communications and ensures that critical communications are maintained. Some communications can be given a higher priority than others. For example, supervisory processes of the vehicle controller 146 provide high level guidance commands to the guidance process. The guidance process uses the current vehicle position provided by the navigation system 130 and calculates fin angles and motor speed that will accomplish the high level guidance. The fin angles and motor speeds are transmitted to the motor actuator controller via the internal network (e.g., the Ethernet system 128) from the motor/actuator controller 140. Other component-to-component interactions could occur between environmental sensors and the sonar component.

The controller 146 may also implement a recorder process. The processes of the vehicle controller 146 may be configured to provide data to the recorder process for storage on a hard disk drive or other writable media. In addition, this process frees other processes/components from storage interface requirements that could impact process scheduling. The data may be utilized for analysis of vehicle mission performance parameters as well as for specific component statistics.

The controller 146 may also implement a log file. The controller 146 can write messages to the log file without slowing down the process of requesting the log entry. The log file message may include the timestamps provided by the component processes. These messages alert the operator to critical issues and help troubleshoot problems that impact future vehicle missions. The log file may contain lessons learned information that is used to make the vehicle 10 more reliable.

In order to synchronize data from the vehicle components, the vehicle controller 146 may provide for a Simple Network Time Protocol Server (SNTP). The vehicle components can synchronize to the vehicle controller 146 by performing SNTP client functions. This provides for comparing data from multiple vehicle components at critical times during mission performance.

The controller 146 may also include the following libraries, which may be accessed by the vehicle controller processes:

a watchdog timer library which provides a facility to start a timer and have specific messages posted when the timer fires;

a system discrete library configured to register, provide control of, provide status for, or receive change in status for any systemwide discrete status signal;

a data subscription library allowing processes to make a single request for another process' data and to receive the data at a specified rate without making further requests;

a timestamp library for providing a high speed timestamp;

a bit array library for providing an abstraction where a memory area can be addressed by using bit numbers to designate certain discrete status signals (this may be used for each process and for the system 100 in conjunction with string tables to provide status);

a string table library for providing status to the user through the use of the bit array library or another binary type data structure;

a socket library for providing networking communications functions;

an Input/Output (I/O) library for providing generic I/O functions for serial and socket connections;

a Real Time Clock (RTC) library for providing an interface to the real time clock of the vehicle controller 146;

a math library for providing mathematical functions and conversions;

a process information library configured to provide information to processes at the time of creation and for the processes and the system to acquire information about other processes; and a vehicle controller initialization library for providing software called by the operator at initialization to configure the launch control console, create all processes and start execution of the processes.

The controller 146 may be joined to various communication systems for external communications (for example: the ACOMMS 104 via the Ethernet system 128 in communication with the serial server 106 and also with an external RF communication system via the RF Ethernet bridge 102). These communications take precedence over internal mission files; thereby, allowing manual override of vehicle control system controls. Exemplary communication systems include: a hardwired system using one or more Ethernet cables; a wireless system available when the vehicle is surfaced; and an acoustic communications system utilized when the vehicle is submerged. Each of these communication systems may be joined to the internal communications system via the Ethernet system.

With more particular reference to the ACOMMS 104, an ACOMMS system provides an alternative means for controlling an autonomous system. ACOMMS may include a vehicle system and a topside system.

The ACOMMS vehicle system also includes an acoustic modem joined to an Ethernet controller (e.g., the serial server 106). The Ethernet controller is connected to the vehicle network (the Ethernet system 128). Vehicle communications are sent from the vehicle controller 146 through the vehicle network (Ethernet system 128) and the Ethernet controller (serial server 106) to the vehicle acoustic modem (ACOMMS 104). The topside system acoustic modem receives transmissions from the vehicle acoustic modem and the topside external processor processes these transmissions.

The ACOMMS topside system may include an application that can send commands to and receive data from the vehicle 10. The application can send vehicle commands to: abort the mission; perform an immediate shutdown; send latest tracking and vehicle data; stop sending periodic tracking data (sleep); or starting sending periodic ACOMMS tracking data (wakeup). The application can also send commands (abort/hold/proceed/end mission) to the onboard autonomous controller 114 via the vehicle controller 146. ACOMMS tracking data received from the vehicle is displayed in the application and a standard National Marine Electronics Association (NMEA) message is created and can be sent to a tracking computer via a UDP network socket to graphically display the vehicle's location using another application.

The ACOMMS vehicle side may support sending periodic vehicle tracking data or other types of data from vehicle components. ACOMMS communication interfaces with other sonar operations in order for the vehicle controller 146 to prioritize sonar operations or ACOMMS operations.

Figure 3:
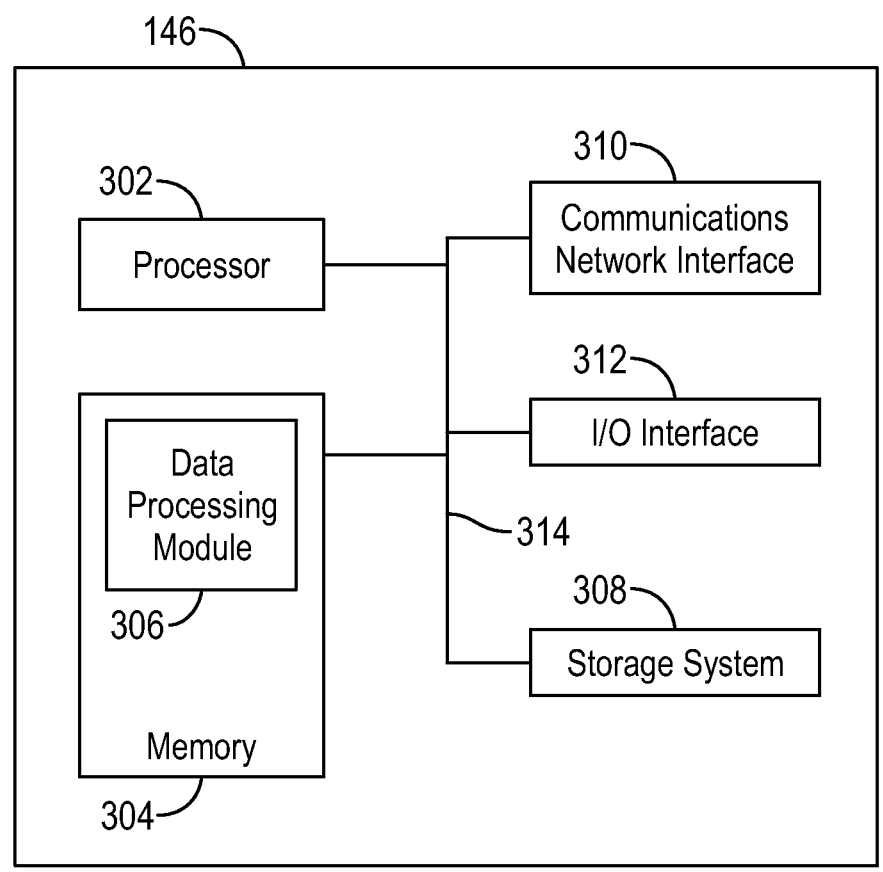
FIG. 3 is a block diagram of a vehicle controller constructed in accordance with the present invention.

Turning now to FIG. 3, shown therein is a block diagram of a vehicle controller 146 constructed in accordance with the present invention. The controller 146 includes one or more processors 302 and a memory 304. The memory 304 may store instructions and data for execution by the processor 302 as well as executable code. The memory 304 includes a data processing module 306. The controller 146 further includes a storage system 308, a communication network interface 310, and an input and output (I/O) interface 312.

The components shown in FIG. 3 are depicted as being communicatively coupled via a bus 314. The processor 302 and memory 304 may be communicatively coupled via a local microprocessor bus, and the storage system 308 may be communicatively coupled via one or more input/output (I/O) buses. The communications network interface 310 communicates with the Ethernet system 128 and/or other digital devices (not shown) via a communications medium.

The storage system 308 includes a mass storage device and/or portable storage medium drive(s). The mass storage device may be implemented with a magnetic disk drive or an optical disk drive. Either drive would be a non-volatile storage device for storing data and instructions for use by the processor 302. The mass storage device stores logic instructions (executable by the processor 302) for implementing embodiments according to the present technology. A portable storage device, as part of the storage system 308, may operate in conjunction with a portable non-volatile storage medium, such as a floppy disk, compact disk or digital video disc (DVD), to input and output data and code to and from the controller 146.

System software for implementing various embodiments may be stored on such a portable medium and input to the controller 146 via the portable storage device. The memory and storage system of the controller 146 may include a non-transitory computer-readable storage medium having stored thereon instructions executable by a processor to perform, at least partially, a method for controlling an underwater vehicle. The instructions include software used to implement modules/components discussed herein, and other modules.

It should be understood that at least a portion of the supervisory functions performed by the controller 146, as described herein, may be defined by instructions that are stored on storage media (for example: computer-readable media). The instructions may be retrieved and executed by the processor of the controller 146. Examples of storage media are memory devices, tapes, disks, integrated circuits, and servers.

It should also be noted that most hardware platforms suitable for performing the processing described herein are suitable for use with various embodiments of the invention. The terms "computer-readable media" and "storage media" as used herein refer to media that provide instructions to a CPU or processor. Such media includes, but is not limited to, non-volatile media, volatile media, and transmission media. Non-volatile media includes optical or magnetic disks, such as a fixed disk. Volatile media includes dynamic memory, such as system RAM.

Transmission media includes coaxial cables, copper wire and fiber optics—including the wires that comprise an embodiment of a bus. Transmission media may take the form of acoustic or light waves, such as those generated during radio frequency (RF) and infrared (IR) data communications. Common forms of computer-readable media include a floppy disk, a flexible disk, a hard disk, magnetic tape, any other magnetic medium, a CD-ROM disk, digital video disk (DVD), any other optical medium, a physical medium with patterns of marks or holes, a RAM, a PROM, an EPROM, an EEPROM, a FLASHEPROM, any other memory chip or cartridge, a carrier wave, or any other medium from which a processor can read.

It will be understood that additional changes in the details, materials, steps and arrangement of parts, which have been herein described and illustrated in order to explain the nature of the invention, may be made by those skilled in the art within the principle and scope of the invention as expressed in the appended claims.

The foregoing description of the preferred embodiments of the invention has been presented for purposes of illustration and description only. It is not intended to be exhaustive nor to limit the invention to the form disclosed; and obviously many modifications and variations are possible in light of the above teaching. Such modifications and variations that may be apparent to a person skilled in the art are intended to be included within the scope of this invention as defined by the accompanying claims.

What is claimed is:

1. A control system for a vehicle, said control system comprising:
    a power distributer to provide operating voltage for said control system;
    start-up circuitry electrically connected to said power distributer;
    a battery electrically connected to said start-up circuitry;
    a serial server electrically connected to said battery
    an acoustic communication transducer capable of interface with said serial server to provide an external acoustic communications system;
    an internal Ethernet-based communications system in operational communication with said serial server;
    a radio frequency Ethernet bridge in operational communication with said internal communications system, said bridge capable of external communication from the vehicle;
    an Ethernet switch in operational communication with said internal communications system and capable of communication with a bathymetric sonar and sidescan sonar of the vehicle;
    a video system in operational communication with said internal communications system;
    a controller configured to communicate via said internal communications system with components of the vehicle including a motor controller of a motor and fins of the vehicle, communicating with a tracking transponder providing data relating to tracking and distance of the vehicle and communicating with a navigation system operating as independent systems of the vehicle; and
    a timestamp system configured to receive and store a timestamp from each of the independent vehicle systems wherein said controller is capable of monitoring the timestamp and based on the timestamp and a preprogrammed response interval, marks a functionality of each of the independent vehicle systems;
    wherein said controller is capable of storing and accessing a plurality of libraries which include casualty condition data, communication protocol data, discrete status signal data, message queue data, process information, real time clock data, vehicle controller initialization data and watchdog timer data;
    wherein said controller is capable of running a supervisory process in order to power and coordinate the independent vehicle systems and data associated with controlling the independent vehicle systems;
    wherein said controller is capable of storing and executing a mission file of guidance data provided by the navigation system such that the guidance data is transmitted to the motor controller;
    wherein said controller is capable of maintaining an operations state for the vehicle during an operational failure of at least one of the independent vehicle systems.

* * * * *